No. 783,555. PATENTED FEB. 28, 1905.
C. D. TABOR.
WINDOW.
APPLICATION FILED AUG. 7, 1903.
5 SHEETS—SHEET 1.
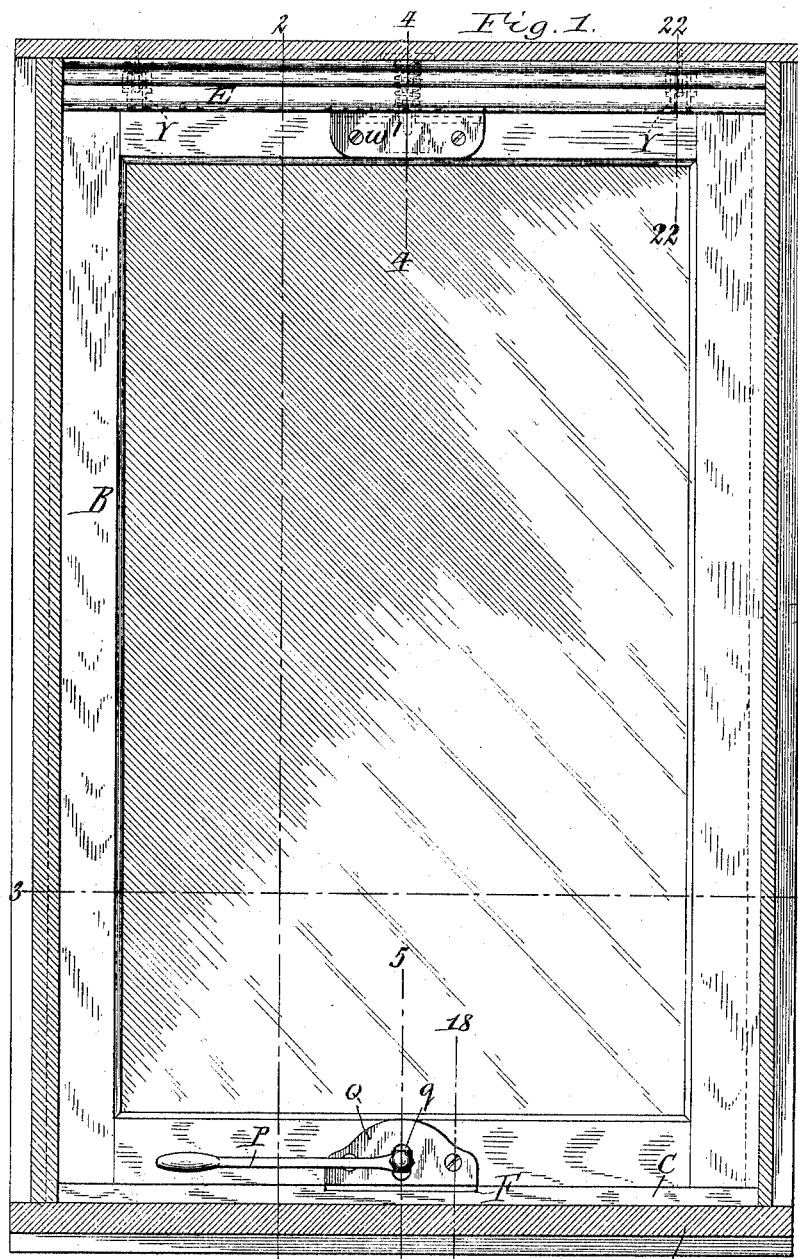
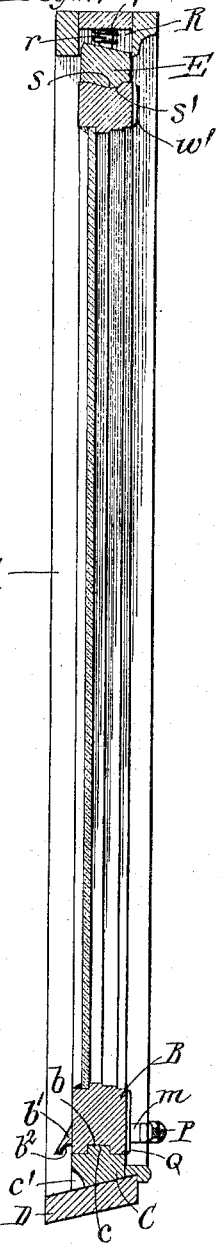
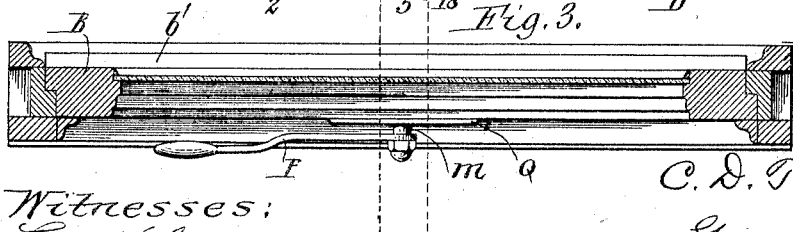
Witnesses:
Louis W. Gratz.
Robert Weitknecht.
C. D. Tabor,
Inventor
By Geyer & Popp
Attorneys No. 783,555. PATENTED FEB. 28, 1905.
C. D. TABOR.
WINDOW.
APPLICATION FILED AUG. 7. 1903.
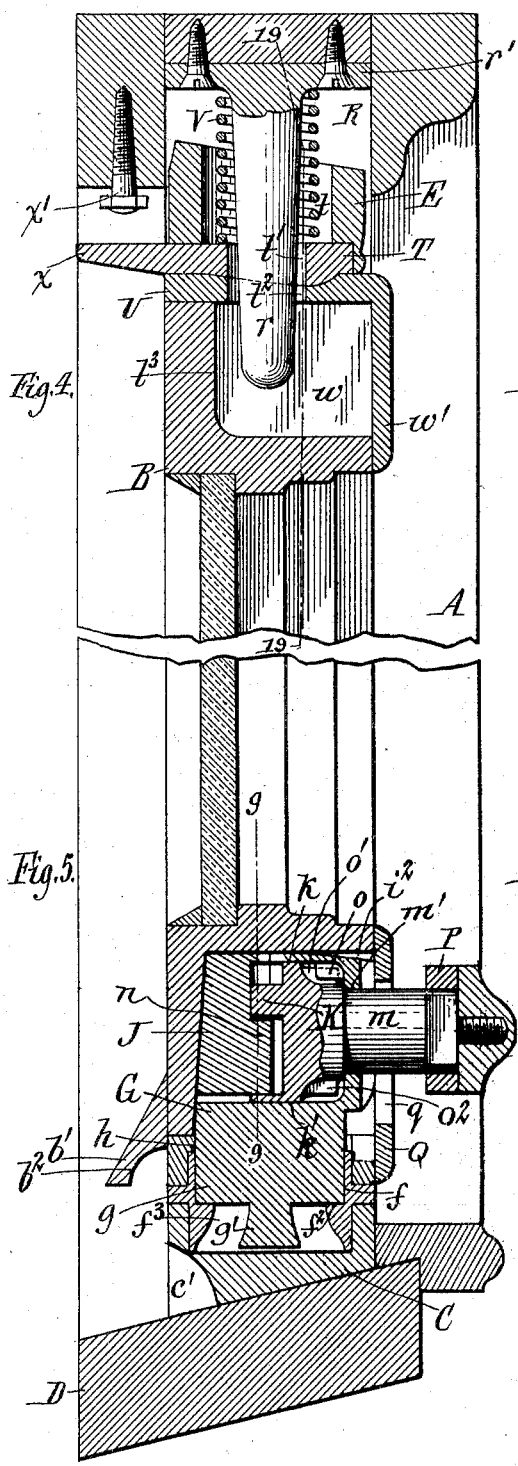
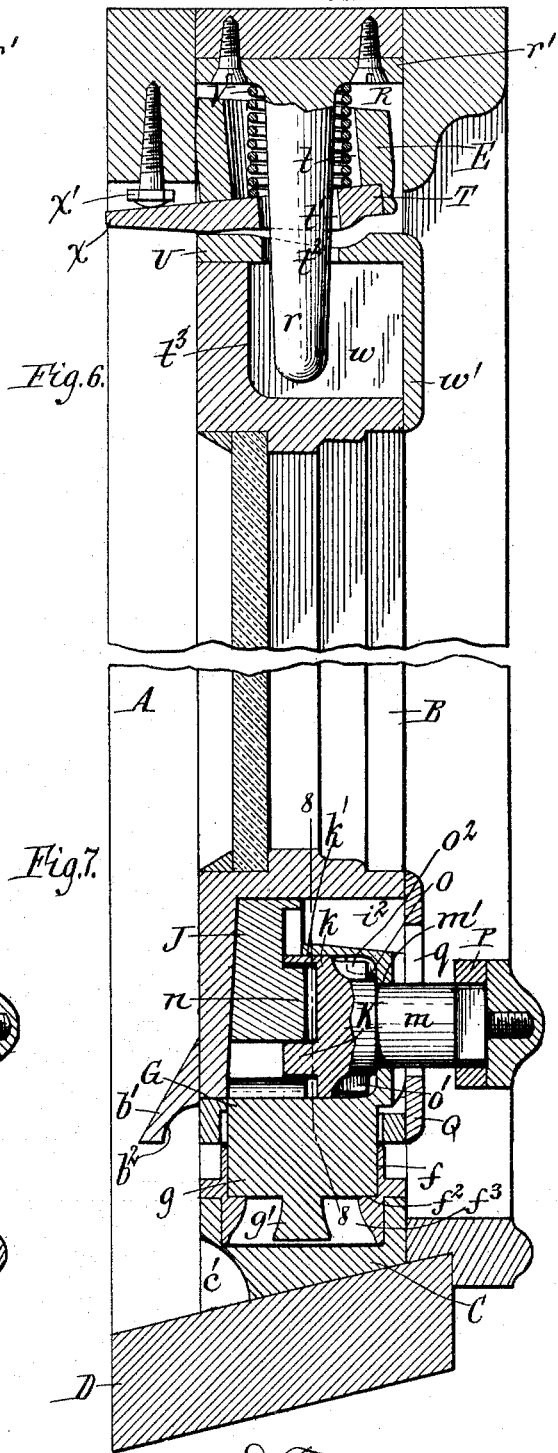
Witnesses:
Louis W Gratz
Robert Weitknecht
C. D. Tabor
Inventor
By Geyer & Popp
Attorneys No. 783,555. PATENTED FEB. 28, 1905.
C. D. TABOR.
WINDOW.
APPLICATION FILED AUG. 7, 1903.
5 SHEETS—SHEET 3.
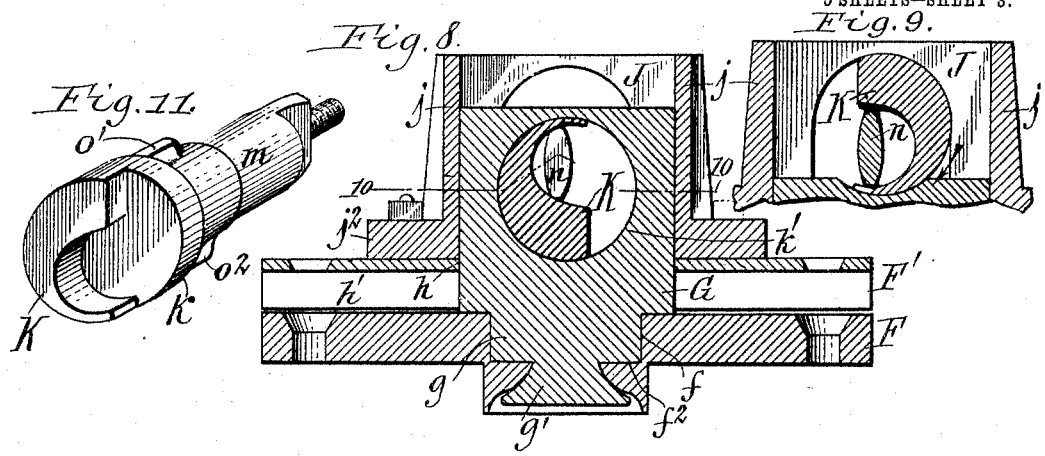
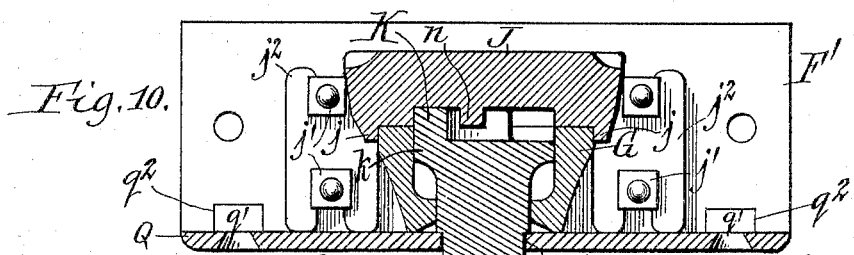
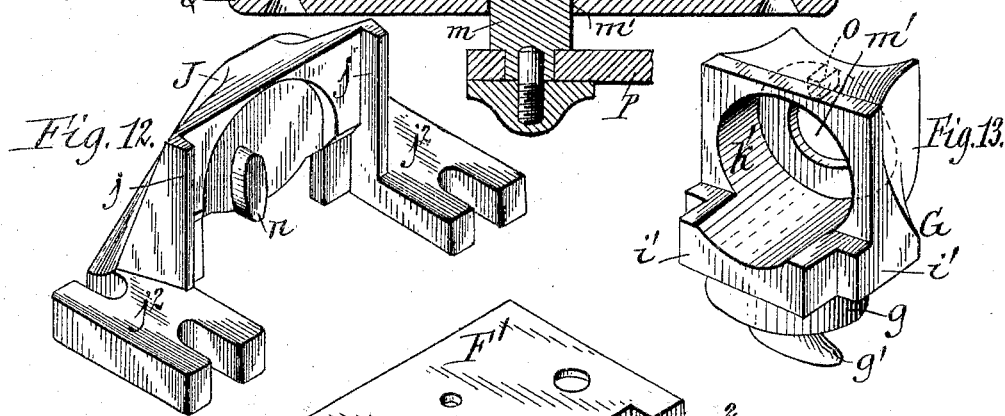
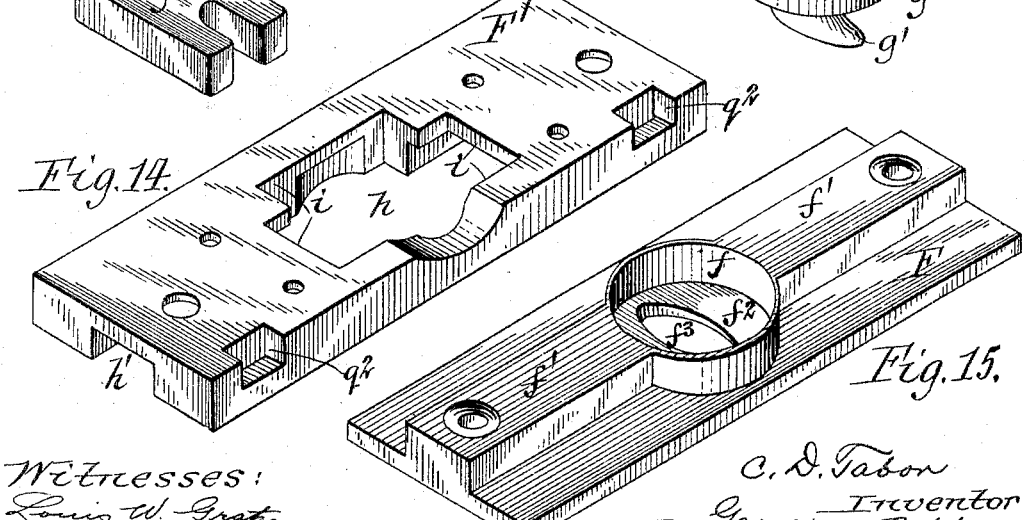
Witnesses:
Louis W. Gratz
Robert Wietknecht
C. D. Tabor
Inventor
By Geyer & Popp
Attorneys No. 783,555. PATENTED FEB. 28, 1905.
C. D. TABOR.
WINDOW.
APPLICATION FILED AUG. 7, 1903.
5 SHEETS—SHEET 5.
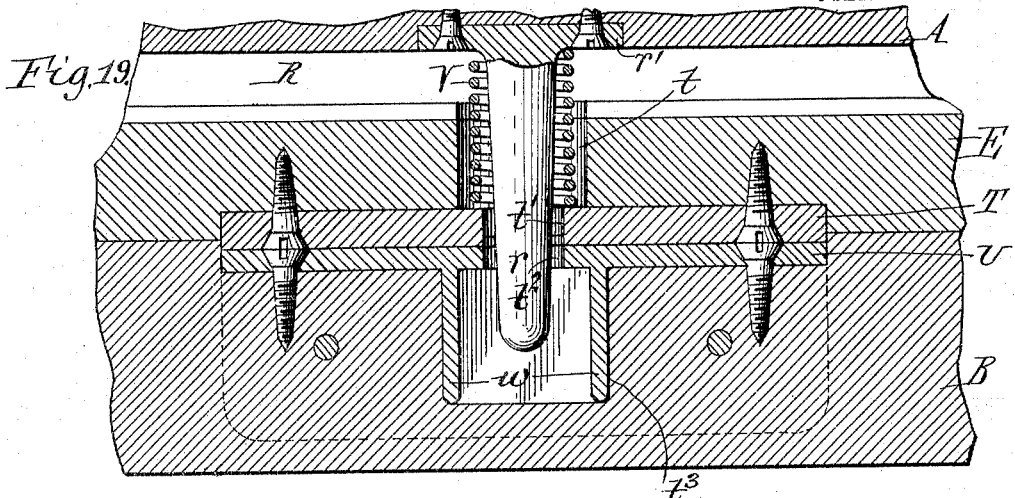
Fig. 19.
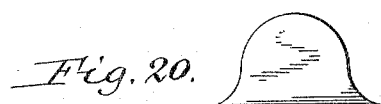
Fig. 20.
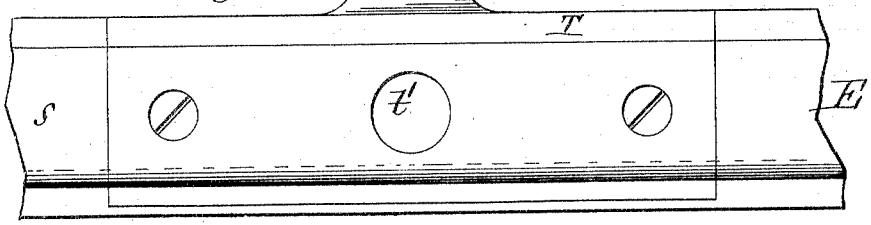
Fig. 21.
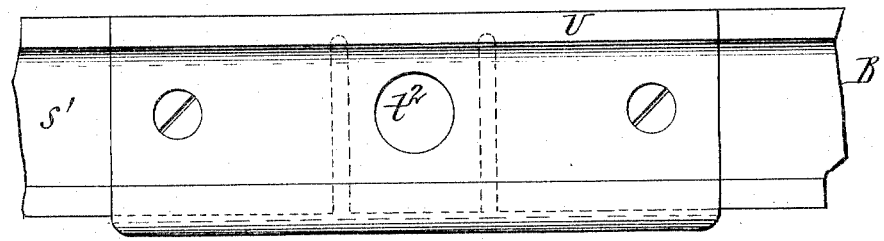
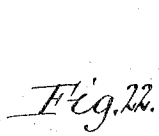
Fig. 22.
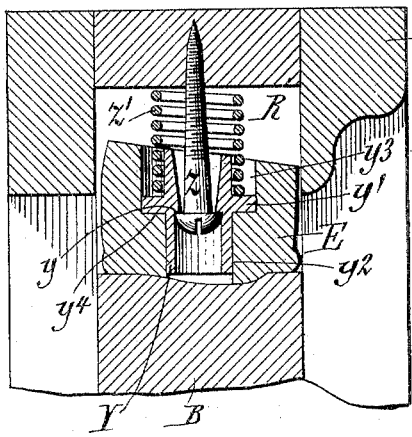
Witnesses:
Louis A. Graf.
Robert Weitknecht.
C. D. Tabor,
Inventor
By Geyer & Popp
Attorneys.

No. 783,555.

Patented February 28, 1905.

UNITED STATES PATENT OFFICE.

CLINTON D. TABOR, OF NEW YORK, N. Y., ASSIGNOR TO TABOR SASH COMPANY, OF NEWARK, NEW JERSEY.

WINDOW.

SPECIFICATION forming part of Letters Patent No. 783,555, dated February 28, 1905.

Application filed August 7, 1903. Serial No. 168,603.

*To all whom it may concern:*

Be it known that I, CLINTON D. TABOR, a citizen of the United States, residing at New York, in the county and State of New York, have invented new and useful Improvements in Windows, of which the following is a specification.

This invention relates to that class of windows in which the sash is mounted to turn horizontally in the frame for opening and closing the same and to move vertically for locking or unlocking the same.

One of the objects of this invention is to provide simple and reliable means whereby the sash may be easily raised and lowered and held in either position.

Another object of this invention is to provide means for relieving the top of the sash from the friction of the weather-strip upon opening or closing the same.

A further object of this invention is to improve the means for retaining the ends of the weather-strip in place.

Figure 16:
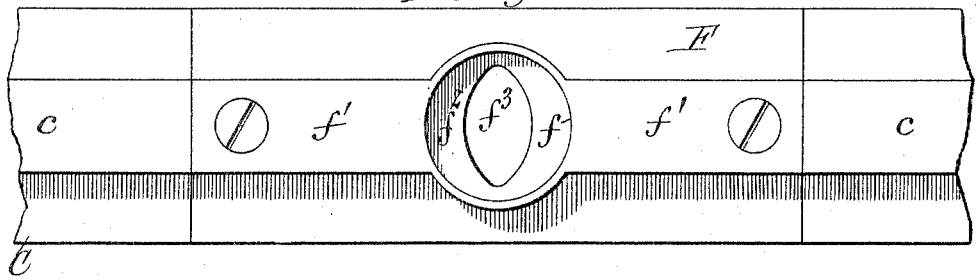
Figure 17:
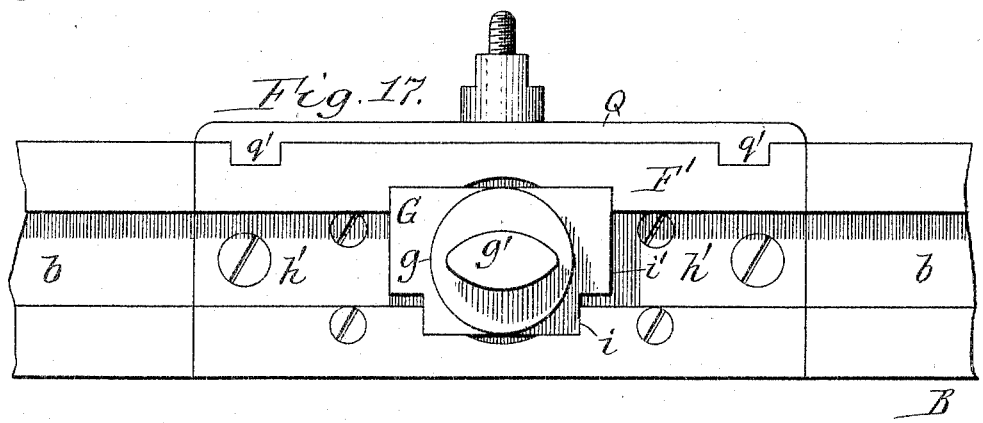
Figure 18:
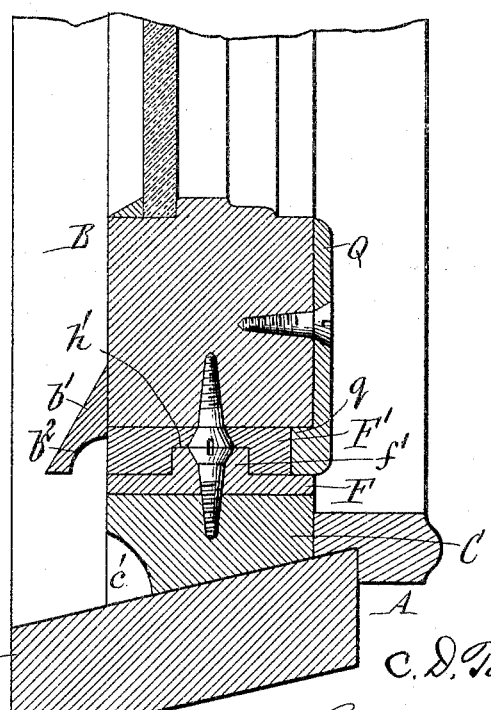

In the accompanying drawings, consisting of five sheets, Figure 1 is a sectional front elevation of a window provided with my improvements viewed from the inside of the building and showing the sash closed. Fig. 2 is a vertical transverse section in line 2 2, Fig. 1. Fig. 3 is a horizontal section in line 3 3, Fig. 1. Figs. 4 and 5 are fragmentary vertical sections, on an enlarged scale, in lines 4 4 and 5 5, Fig. 1, respectively, showing the sash closed and locked. Figs. 6 and 7 are sectional views similar to Figs. 4 and 5, showing the sash unlocked. Fig. 8 is a vertical longitudinal section of the lower pivot-fixture, taken in line 8 8, Fig. 7, showing the position of the parts when the sash is raised. Fig. 9 is a similar view taken in line 9 9, Fig. 5, showing the position of the parts when the sash is lowered. Fig. 10 is a horizontal section in line 10 10, Fig. 8. Figs. 11, 12, 13, 14, and 15 are perspective views of different parts of the lower pivot-fixture. Fig. 16 is a top plan view of the bed-strip and the face-plate mounted thereon. Fig. 17 is a bottom plan view of the sash and the part of the pivot-fixture mounted thereon. Fig. 18 is a vertical cross-section, on an enlarged scale, in line 18 18, Fig. 1. Fig. 19 is a fragmentary longitudinal section in line 19 19, Fig. 4. Fig. 20 is a bottom plan view of the weather-strip between the top of the sash and the frame and the face-plate thereon. Fig. 21 is a fragmentary top plan view of the sash and the face-plate thereon. Fig. 22 is a fragmentary vertical transverse section, on an enlarged scale, in line 22 22, Fig. 1, showing the means for holding the end of the weather-strip in place.

Similar letters of reference indicate corresponding parts throughout the several views.

A represents the window-frame; B, the sash arranged in the frame; C, the bed or strip arranged below the sash and secured to the sill D, and E the weather-strip arranged between the top of the sash and the frame.

The sash is so mounted on the frame that it can be raised and lowered a limited extent for unlocking or locking the sash and that it can also be turned in a horizontal plane for opening or closing the same. On the under side of its lower rail the sash is provided with a longitudinal groove $b$, and the opposing upper side of the bed is provided with a longitudinal rib or tenon $c$. In the normal closed and lowered position of the sash its groove $b$ is engaged by the tenon, thereby preventing the sash from turning horizontally and also forming a weather-tight joint between the sash and frame at this point, as shown in Fig. 2.

F F' represent the metal face-plates of the fixture whereby the lower end of the sash is pivoted vertically to the frame. The face-plate F is secured lengthwise to the central part of the bed-strip and is provided centrally with a vertical cylindrical socket $f$ and on the opposite sides of the socket with tenons or ribs $f'$, which form continuations of the wooden rib $c$ of the bed, as shown in Fig. 16. The bottom $f^2$ of the socket contains an oblong opening $f^3$.

G represents a bearing or coupling block provided on its under side with a depending cylindrical pivot or trunnion $g$, which turns in the socket $f$. This trunnion is normally held against upward movement in the socket by an enlarged or T-shaped coupling-head $g'$, projecting from its under side through the oblong opening in the bottom of the socket and normally engaging its extremities with the under side of said bottom. For attaching the bearing-block to the bed face-plate the block is turned so that its coupling-head registers with the opening $f^3$ in said plate and then passing said head through said opening and turning the same so that its extremities are carried underneath the socket-bottom on opposite sides of the narrow part of the opening therein.

The face-plate F' is attached to the under side of the lower sash-rail. This plate is provided centrally with an opening $h$, in which the bearing-block is guided, and on opposite sides of said opening with longitudinal grooves $h'$, which receive the ribs $f'$ of the bed face-plate and form continuations of the groove $b$ in the wooden part of the bed. The sides of the opening $h$ in the lower sash face-plate are flat or angular, as shown at $i$ in Fig. 14, and the part $i'$ of the bearing-block above its trunnion which enters the opening $h$ is of correspondingly angular form, thereby coupling the lower sash-plate and the trunnion, so as to compel these parts to turn together horizontally, but permitting the sash to slide vertically on the trunnion. Above the lower face F' the sash is provided with a recess $i^2$ in line with the opening $h$ in the plate.

J represents a bracket arranged on top of the lower sash-plate within the outer part of the recess $i^2$ and provided on opposite sides with vertical guideways or flanges $j$, between which the upper part of the bearing-block is guided. For convenience in manufacturing, the bracket is preferably made separate from the sash face-plate and connected therewith by bolts $j'$ passing through the plate and lugs $j^2$ on the bracket.

K represents an oscillating wedge for moving the sash vertically. This wedge is curved or crescent-shaped and arranged on the inner end of a cylindrical body $k$, which is journaled in a horizontal bearing $k'$ in the bearing-block above the trunnion, as shown in Figs. 8, 9, and 11. At its outer end the wedge-body $k$ has a spindle $m$, which projects through an opening $m'$ in a wall at the outer wall of the bearing $k'$.

$n$ represents a shifting lug projecting from the inner side of the bracket J into the path of the concave side of the wedge. Upon turning the wedge forwardly in the direction of the arrow, Fig. 9, the same advances with its narrow end and moves its gradually-widening part between the lower part of the cylindrical bearing and the under side of the shifting lug $n$, whereby the latter is raised, as shown in Fig. 8, together with the sash and the parts mounted thereon. Upon turning the wedge in the opposite direction the same advances with the wide end and presents its gradually-narrowing parts between the shifting lug and the opposing lower side of the bearing, thereby permitting the lug and sash to descend by gravity. While raising and lowering the sash the wedge cannot move vertically with the same, because its bearing holds it against such movement. If for any reason the sash should bind and not descend freely during the return movement of the wedge, the same upon moving between the upper sides of the lug and the bearing will force the sash down. At either extremity of its movement the concave side of the wedge bears against the upper and lower ends of the shifting lug, whereby the sash is firmly held either in its open or closed position. In the lowered position of the sash the narrow end of the wedge engages the under side of the shifting lug and while the wide end of the wedge bears against the top of the lug, as shown in Fig. 9; but upon turning the wedge half-way round the narrow end of the wedge engages with the top of the shifting lug and its wide end against the bottom thereof, as shown in Fig. 8. The turning movement of the wedge is preferably effected by means of a lever or handle P, secured to the outer end of the spindle $m$. This lever is so applied that it projects horizontally from one side of the spindle in the closed position of the sash and horizontally from the opposite side of the spindle in the open position of the sash. As the fit between the lug $n$ and the wedge $k$ is liable to be rather loose, the place at which the wedge stops upon closing the sash would be indefinite, and therefore cause the handle P to assume a more or less inclined position at this time, and therefore be unsightly. In order to avoid this, a separate stop device independent of the wedge and lug is employed for definitely arresting the cam when the sash is closed. This stop device preferably consists of a stop-lug $o$, arranged in the bearing $k'$, and stop-lugs $o'$ $o^2$, arranged on diametrically opposite sides of the spindle $m$ and adapted to engage alternately with opposite sides of the stationary stop-lug $o$.

Q represents a front plate secured to the inner side of the sash so as to cover the recess $i^2$. This plate is provided with a vertical slot $q$, through which the wedge-spindle projects and which is of sufficient height to permit the sash to be raised and lowered freely by the wedge. At its lower edge the cover-plate is provided with inwardly-projecting lugs $q'$, which fit into corresponding recesses $q^2$ in the adjacent edge of the lower sash face-plate, as shown in Figs. 10, 17, and 18, thereby insuring proper alinement of these parts in applying them to the sash.

The throw of the wedge is such that the sash may be raised somewhat more than the height of the rib on the bed-strip, so as to permit the sash when elevated to be turned horizontally clear of the rib into a more or less open position, as shown by dotted lines in Fig. 3.

The construction of the shifting wedge herein shown permits the sash to be raised and lowered easily, gradually, and uniformly throughout the entire movement of the wedge. In all positions of the wedge a part of the same is interposed directly between the under side of the lug $n$ and the lower side of the bearing in which the wedge is journaled, thereby providing a solid and firm support for the sash which is not liable to give way. The wedge is also unaffected by the weight of the sash, thereby preventing the sash from descending suddenly and jerking the operating-crank while in the hand of the attendant. Furthermore, the wedge forms a positive lock which holds the sash securely in its elevated or depressed position, thereby avoiding the necessity for employing a separate lock for this purpose.

In the closed position of the sash the coupling-head $g$ of the lower pivot-fixture is arranged crosswise underneath the bottom $f^2$ of the socket, thereby preventing the lower pivot from being lifted out of its socket while the parts are in this position if an attempt is made to open the sash from the outer side while the same is locked down by the wedge.

The upper part of the weather-strip is arranged in a longitudinal channel R, formed on the under side of the adjacent frame-head, and the under side of the strip is provided with a longitudinal tenon, bead, or rib $s$, which normally engages with a corresponding groove $s'$ in the upper edge of the top sash-rail. The opposing central parts of the weather-strip and the top sash-rail are provided with metal face-plates T U, which are provided with a coöperating tenon and a groove forming a continuation of the tenon and groove in the adjacent wooden parts of the strip and rail, as shown in Figs. 20 and 21.

$r$ represents a vertical pin whereby the upper end of the sash is pivoted on the head of the frame. This pin is provided at its upper end with a base-plate $r'$, which is secured to the bottom of the channel R, while its lower end projects downwardly through openings $t$ $t'$ $t^2$, formed centrally in the weather-strip E, strip-plate T, and upper sash-plate U and into a recess $t^3$, formed in the upper sash-rail below the face-plate U.

V represents a spring surrounding the pivot-pin and bearing at its opposite ends against the base of the pin and the upper side of the strip face-plate. The opening $t$ in the strip is made sufficiently large to accommodate the spring and to expose the strip-plate to provide a shoulder or bearing for receiving the lower end of the spring.

The recess $t^3$ in the upper sash-rail must be of sufficient depth to provide the requisite play between the bottom of the recess and the lower end of the pivot-pin for permitting the sash to be raised clear of the rib on the bed-strip. In order to secure the required depth of the recess $t^3$ for this purpose, the under side of the upper sash-plate is provided on opposite sides of its opening $t^2$ with depending gage-lugs $w$, which are of a height equal to the required depth of the recess $t^3$. The carpenter in fitting the upper sash-plate to the upper sash-rail is thus compelled to recess the latter sufficiently to receive the gage-lugs, thereby incidentally forming the recess of the proper depth to provide the required play between its bottom and the lower end of the pivot-pin. To permit of conveniently installing the sash, the recess $t^3$ in its top extends to the inner side thereof, thereby enabling the upper end of the sash to be engaged with the pivot-pin by moving the recessed part of the sash laterally relatively to the pivot-pin after the lower end of the sash has been pivotally connected with the bed-strip. The side of the recess $t^3$ is normally closed by a depending cover-plate $w'$, which is formed integrally with the upper sash-plate and the gage-lugs $w$ and is secured to the inner side of the sash by screws or otherwise.

For the purpose of permitting the sash to be turned open easily after the same has been raised and unlocked, a shifting device is provided which automatically tilts the weather-strip and disengages its rib from the groove of the sash during the operation of raising the same. This shifting device comprises a finger or tail $x$ projecting outwardly from the weather-strip and a stop $x'$ arranged on the frame-head in position to be engaged by said tail. The latter is preferably formed in one piece with the strip-plate, and the stop preferably consists of a screw which permits of adjusting the position of the stop relatively to the tail. When the sash is in its lowered and closed position and the weather-strip engages fully on its under side with the upper edge of the sash, the tail $x$ is arranged some distance below the stop $x'$, as shown in Figs. 4 and 5. During the first part of the upward movement of the sash for unlocking the same the weather-strip rises with the sash without shifting the strip relatively to the sash; but during the last part of the rising movement of the sash the tail $x$ of the weather-strip engages the stop $x'$ and is arrested by the latter, thereby causing the weather-strip to be rocked transversely along its outer lower edge on the sash and lifting its rib out of the groove of the sash, as shown in Figs. 6 and 7. While the parts are in this position, the sash can be turned freely and easily into an open or closed position with little effort. In the absence of the strip-tilting device the disengagement of the sash and weather-strip would be effected solely by the wedge action of the interlocking groove and tenon, which would require more power owing to the unfavorable leverage and the spring-pressure which resists the disengagement of the tenon of the weather-strip from the groove of the sash. Upon closing the sash and lowering the same into its locked position the tail $x$ recedes from the stop $x'$, thereby permitting the weather-strip to resume its normal position for producing a tight joint between the upper part of the sash and frame.

At opposite ends of the weather-strip retaining devices are provided which hold the strip firmly against the sash when closed and also prevent the strip from sagging when the sash is turned open. Each of these retaining devices is constructed as follows: Y represents a cylindrical thimble, which is provided about midway with an internal downwardly-facing shoulder $y$ and an external flange $y'$. Near each end of the weather-strip the same is provided with a vertical socket comprising a reduced lower portion $y^2$ and an enlarged upper portion $y^3$, forming an upwardly-facing shoulder $y^4$ between the two parts of the socket. The lower end of the thimble is fitted into the lower part $y^2$ of the socket and its external flange is engaged with the internal shoulder of the socket. $z$ represents a stop having the form of a screw which extends through the thimble and bears with its head at its lower end against the internal shoulder thereof, while its upper threaded end is secured in the bottom of the channel. $z'$ represents a spring surrounding the upper end of the thimble and bearing at its opposite ends against the flange of the thimble and the bottom of the channel. In the normal position of the parts (shown in Fig. 22) the springs $z'$ exert sufficient pressure against the weather-strip to hold the ends thereof firmly against the sash. When the sash is turned open, the ends of the strip are sustained by the stop-screw limiting the drop of the weather-strip at its ends and preventing the same from interfering with the sash upon subsequently turning the sash into a closed position. As shown in the drawings, the thimbles are secured in the weather-strip by a driving fit; but, if desired, the same may be secured by a screw-fastening or other means.

On its outer side immediately above its lower edge the sash is provided with a horizontal deflecting strip $b'$, having a longitudinal concave groove $b^2$ in its under side. Water running down the outer side of the sash is deflected outwardly and caused to drop on the sill beyond the bed-strip, while the groove in its under side prevents the water from creeping inwardly on this side of the strip $b'$ to the sash, thereby preventing this water from reaching the joint between the sash and bed-strip and passing through the same. Below the joint between the lower end of the sash and the bed-strip the latter is provided on its outer side with a horizontal groove $c'$, which is concave vertically. Any rain which is driven during a storm sidewise into this groove of the bed-strip is deflected away from the joint between the bed-strip and sash, and thus reduces the liability of water passing through the window at this joint.

I claim as my invention—

1. The combination of a window-frame, a sash mounted therein to turn horizontally, a vertical trunnion pivotally connecting the sash and frame, and a wedge for moving the sash vertically mounted on the trunnion but held against vertical movement with the sash, substantially as set forth.

2. The combination of a window-frame, a sash mounted therein to turn horizontally, a vertical trunnion pivotally connecting the sash and frame and provided with a bearing, and a rotary wedge for moving the sash vertically journaled in said bearing but held against vertical movement with the sash, substantially as set forth.

3. The combination with a window comprising a frame member and a sash member capable of turning horizontally and also moving vertically, of a curved wedge mounted on one of said window members and turning in a vertical plane, and an abutment arranged on the other window member and engaging with said wedge, substantially as set forth.

4. The combination with a window comprising a frame member and a sash member capable of turning horizontally and also moving vertically, said members having their lower parts constructed to interlock in the lowered position of the sash, of a curved wedge mounted on one of said window members and turning in a vertical plane, and an abutment mounted on the other window member and engaging with said wedge, substantially as set forth.

5. The combination with a window comprising a frame member and a sash member capable of turning horizontally and also moving vertically, said members having shoulders on their lower parts which are constructed to interlock and hold the sash against turning in the closed and lowered position of the sash, of a vertical pivot connecting the lower parts of the sash and frame, a horizontal bearing arranged on one of said window members, a cylindrical body journaled in said bearing and provided with a curved wedge, and a lug mounted on the other window member and engaging with said wedge, substantially as set forth.

6. The combination of a window comprising a frame member and a sash member capable of turning horizontally and moving vertically in said frame member, the lower parts of said members being provided with shoulders which are constructed to interlock in the closed and lowered position of the sash member, a vertical trunnion pivotally connecting said window members and provided with a horizontal bearing, a cylindrical body journaled in said bearing, an operating-handle connected with the outer end of said cylindrical body, a lug arranged on the sash member, and a curved wedge arranged on the inner end of the cylindrical body and moving between the upper side of said trunnion and the under side of said lug, substantially as set forth.

7. The combination of a window-frame, a sash mounted therein to turn horizontally, a face-plate arranged on the lower part of the sash and coöperating with a face-plate on the lower part of the frame, a trunnion turning in the frame face-plate and connected with the sash face-plate so that the latter is compelled to turn with the trunnion but is free to slide vertically therein, a wedge for moving the sash vertically journaled on the trunnion but held against vertical movement with the sash, and a lug mounted on the sash and engaging with said wedge, substantially as set forth.

8. The combination of a window-frame, a sash mounted therein to turn horizontally, a face-plate applied to the lower part of the frame and provided with a socket, a face-plate applied to the lower part of the sash and provided with a flat-sided guide-opening, a coupling-block having a trunnion turning in said socket, a flat-sided portion arranged in said guide-opening and a bearing, a rotary wedge for moving the sash vertically journaled in said bearing but held against vertical movement with the sash, and a lug mounted on the sash and engaging with said wedge, substantially as set forth.

9. The combination of a window-frame, a sash mounted therein to turn horizontally, a face-plate applied to the lower part of the frame and provided with a socket, a face-plate applied to the lower part of the sash and provided with a flat-sided guide-opening, a coupling-block having a trunnion turning in said socket, a flat-sided portion arranged in said guide-opening and a bearing, a rotary wedge for moving the sash vertically journaled in said bearing but held against vertical movement with the sash, and a bracket arranged on the sash face-plate and provided with a lug engaging with the wedge, substantially as set forth.

10. The combination of a window-frame, a sash mounted therein to turn horizontally, a face-plate applied to the lower part of the frame and provided with a socket, a face-plate applied to the lower part of the sash and provided with a flat-sided guide-opening, a coupling-block having a trunnion turning in said socket, a flat-sided portion arranged in said guide-opening and a bearing, a rotary wedge for moving the sash vertically journaled in said bearing but held against vertical movement with the sash, a lug mounted on the sash and engaging with said wedge, and a hand-lever for operating said wedge, substantially as set forth.

11. The combination of a window-frame, a sash mounted therein to turn horizontally, a face-plate applied to the lower part of the frame and provided with a socket, a face-plate applied to the lower part of the sash and provided with a flat-sided guide-opening, a coupling-block having a trunnion turning in said socket, a flat-sided portion arranged in said guide-opening and a bearing, a rotary wedge for moving the sash vertically journaled in said bearing but held against vertical movement with the sash, a lug mounted on the sash and engaging with said wedge, a hand-lever for operating said wedge, and a cover-plate applied to the sash and provided with a vertical slot through which the spindle of the wedge projects, substantially as set forth.

12. The combination of a window-frame, a sash mounted therein to turn horizontally, a face-plate applied to the lower part of the frame and provided with a socket and an elongated opening in the bottom of the socket, a trunnion turning in said socket and provided at its lower end with a T-shaped head which is constructed to pass through said opening and engage with the under side of said socket and at its upper end with a bearing, a wedge for moving the sash vertically journaled in said bearing but held against vertical movement with the sash, and a lug mounted on the sash and engaging with said wedge, substantially as set forth.

13. The combination of a window-frame, a sash mounted therein to turn horizontally, a weather-strip interposed between the top of the sash and the frame, a vertical pivot-pin secured to the top of the frame and projecting downwardly through openings in the weather-strip and sash, and a spring surrounding said pin and operating to press the weather-strip against the sash, substantially as set forth.

14. The combination of a window-frame, a sash mounted therein to turn horizontally, a weather-strip arranged with its upper side in a channel in the head of the frame and provided on its under side with a rib which engages with a groove in the upper end of the sash, a face-plate applied to the under side of the strip, a vertical pivot-pin secured to the bottom of said channel and projecting downwardly through openings in the weather-strip, face-plate and sash, and a spring surrounding the pin and bearing at its ends against the bottom of the channel and the upper side of said face-plate, substantially as set forth.

15. The combination of a window-frame, a sash mounted to turn horizontally in the frame and provided with a recess in its top which extends to one side thereof, a weather-strip interposed between the top of the sash and the frame, a pivot-pin secured to the frame and entering said recess, and a face-plate applied to the sash and provided with an opening which receives the pin, substantially as set forth.

16. The combination of a window-frame, a sash mounted therein to turn horizontally, a weather-strip arranged with its upper side in a channel in the head of the frame and provided on its under side with a rib which engages with a groove in the upper end of the sash, a face-plate applied to the top of the sash and provided with two depending lugs arranged in a recess in the sash, a vertical pivot-pin secured to the head of the frame and projecting downwardly through openings in the weather-strip and sash face-plate and into said recess, and a spring operating to press said strip against the sash, substantially as set forth.

17. The combination of a window-frame, a sash mounted therein to turn horizontally, a weather-strip arranged with its upper side in a channel in the head of the frame and provided on its under side with a rib which engages with a groove in the upper end of the sash, a horizontal face-plate applied to the top of the sash and provided with two depending lugs arranged in a recess in the top of the sash and a vertical plate which covers said recess on one side of the sash, a vertical pivot-pin secured at its upper end to the head of the frame and projecting at its lower end through an opening in the weather-strip and the sash face-plate and into said recess, and a spring operating to press the strip against the sash, substantially as set forth.

18. The combination of a window-frame, a sash mounted therein to turn horizontally and move vertically, a weather-strip interposed between the top of the sash and the frame, the opposing sides of the sash and strip having a coöperating rib and groove, and a shifting device which rocks said strip transversely for disengaging the rib and groove and which is operated by the lifting movement of the sash, substantially as set forth.

19. The combination of a window-frame, a sash mounted therein to turn horizontally and move vertically, a weather-strip interposed between the top of the sash and the frame, the opposing sides of the sash and strip having a coöperating rib and groove, and a shifting device for rocking the weather-strip transversely and disengaging said rib and groove comprising a tail which projects laterally from the strip and a stop arranged on the frame in position to be engaged by said tail upon raising the sash, substantially as set forth.

20. The combination of a window-frame, a sash mounted therein to turn horizontally and move vertically, a weather-strip interposed between the top of the sash and the frame, the opposing sides of the sash and strip having a coöperating rib and groove and a shifting device for rocking the weather-strip transversely and disengaging said rib and groove comprising a tail which projects laterally from the strip and a vertical stop-screw secured to the head of the frame in position to be engaged by said tail upon raising the sash, substantially as set forth.

21. The combination of a window-frame, a sash mounted to turn therein, a movable strip interposed between the sash and frame, and means for retaining the movable strip in place comprising a spring operating to press the strip against the sash and a stop connected with the frame and operating to limit the movement of said strip toward the sash, substantially as set forth.

22. The combination of a window-frame, a sash mounted to turn therein, a movable strip interposed between the sash and frame, and a retaining device for holding the strip in place comprising a thimble seated in a socket in the strip and having a collar bearing against a shoulder in the socket, a stop-screw secured at its threaded end to the frame and bearing with its head end against an internal shoulder in the thimble, and a spring surrounding the stop-screw and bearing at its ends against the frame and the collar of said thimble, substantially as set forth.

Witness my hand this 16th day of May, 1903.

CLINTON D. TABOR.

Witnesses:
 FRED. W. PARKER,
 OWEN P. CASEY.